United States Patent

[11] 3,596,225

| [72] | Inventor | John T. Cary<br>Markham, Ill. |
|---|---|---|
| [21] | Appl. No. | 841,812 |
| [22] | Filed | July 15, 1969 |
| [45] | Patented | July 27, 1971 |
| [73] | Assignee | Continental Can Company, Inc.<br>New York, N.Y. |

[54] PIGTAIL ROTARY JOINT
7 Claims, 4 Drawing Figs.

[52] U.S. Cl. .................................................. 339/5,
 310/242, 310/247
[51] Int. Cl. .................................................. H01r 39/00
[50] Field of Search .................................... 310/40, 66,
 67, 238, 239, 242, 224, 247, 248, 249; 219/66;
 339/5, 8

[56] References Cited
UNITED STATES PATENTS

| 541,641 | 6/1895 | Still ............................ | 310/40 |
| 737,253 | 8/1903 | Lindenberger ............. | 310/40 |
| 1,965,361 | 6/1934 | Watts .......................... | 310/247 |
| 2,418,607 | 4/1947 | Suydam ...................... | 310/40 |
| 2,516,608 | 6/1950 | Wightman ................... | 310/247 |
| 2,870,354 | 1/1959 | Antonidis ................... | 310/249 |

Primary Examiner—Milton O. Hirshfield
Assistant Examiner—R. Skudy
Attorney—Diller, Brown, Ramik and Holt ABSTRACT: A rotary joint for transferring high amperage electrical energy between a stationary member and a rotary member and particularly relates to a coupling member fixedly carried by the fixed member and having brushes engaged with an internal cylindrical surface on the rotary member. A principal feature of the rotary joint is that the brushes are permanently, yet flexedly, connected to a stationary hub of the coupling member, whereby the only relative moving surfaces are those of the brushes and the internal cylindrical surface and wherein any misalignment or eccentricity between the rotating member and the coupling member is readily accommodated for by the shifting of the brushes.

INVENTOR
JOHN T. CARY

Diller, Brown, Ramik + Wret
ATTORNEYS

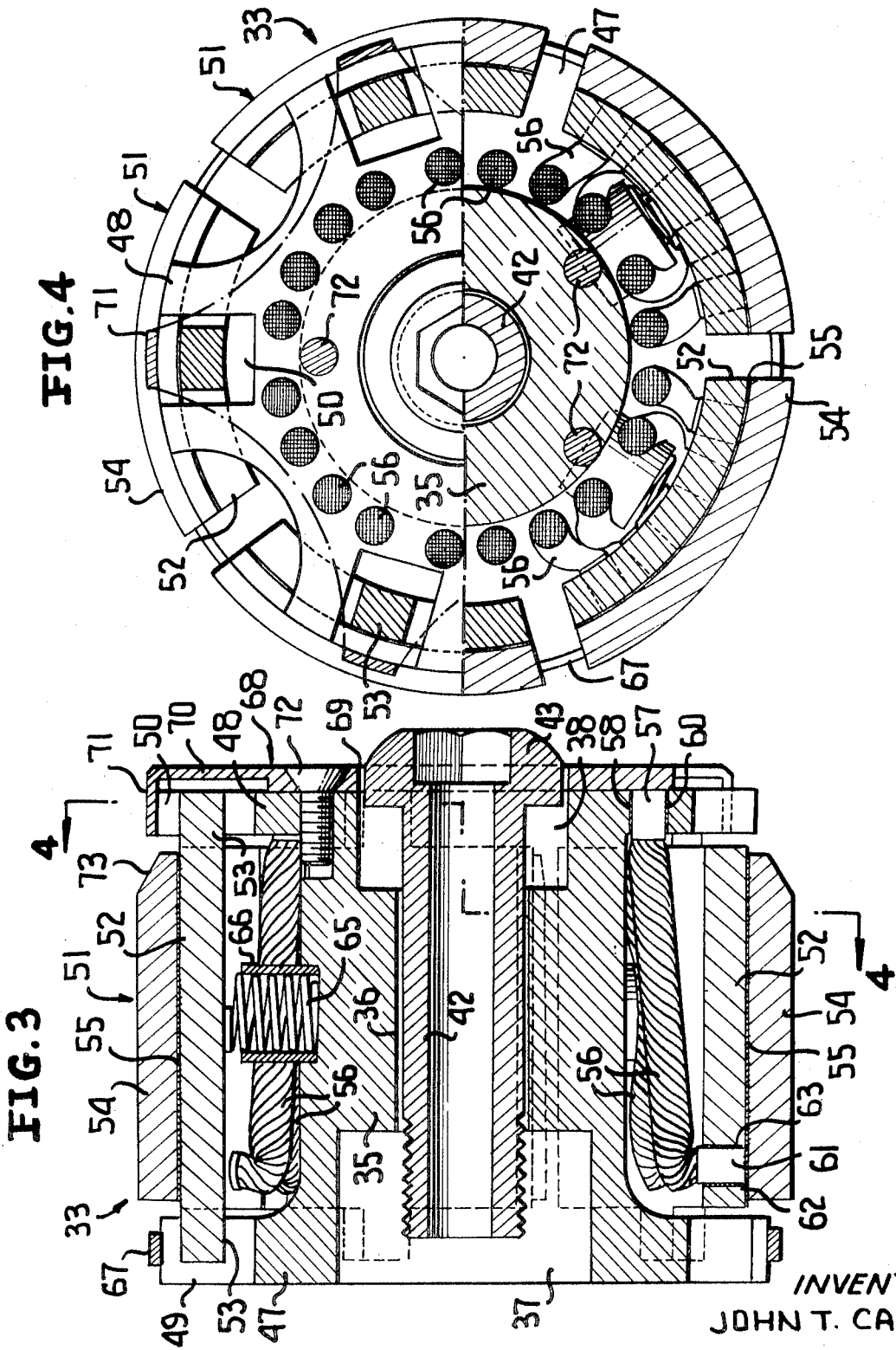

PIGTAIL ROTARY JOINT

This invention relates in general to new and useful improvements in rotary joints, and more particularly to a rotary joint which is capable of transferring high amperage electrical energy between a fixed member and a rotating member. In rotary joints, a particularly troublesome problem is the fact that it is virtually impossible to mount the rotating member so that it rotates without any eccentricity whatsoever. As a result, in the past, rotary joints have been constructed wherein brush elements or the equivalent thereof are mounted not only for wiping contact with the rotary member, but also for relative wiping contact with respect to the fixed member. As a result, prior rotary joints had numerous interface surfaces which were not only the source of resistances to current flow, but also required special mating so as to assure proper current flow thereacross. It will be readily apparent that such prior rotary joints required not only precision machining, but also careful run-in before they could be operational. In addition, it will be apparent that there could be not interchangeability of mating components.

In accordance with this invention, it is proposed to provide a rotary joint which includes merely an interior cylindrical surface on the rotary member and a coupling member having floating brushes which have wiping current transferring engagement with the cylindrical surface of the rotary member with the brushes freely floating with respect to a hub of the coupling member for intimate contact with the cylindrical surface and being electrically connected to the hub by means of flexible pigtails whereby the interface of the rotary joint is limited to that between the brush surfaces and the cylindrical surface, thereby greatly reducing the resistance of the electrical joint while at the same time eliminating the necessity for run-in of the surfaces, thereby permitting the coupling member to be readily interchanged with rotary members and vice versa.

Another features of this invention is the construction of the coupling member as a readily handleable unit wherein the brushes thereof are resiliently urged outwardly from the hub thereof, but so restrained whereby the brushes remain a part of the coupling member until specifically released, and wherein the leading ends of the business are tapered so as to facilitate the insertion thereof into the rotary member.

A further feature of this invention is the mounting of each brush on a separate shoe and the securement of the shoe to the pigtail with there being utilized different bonding materials, the melting point of the bonding material between the brush and the shoe being higher than the melting point of the bonding material between the shoe and the pigtail whereby a brush may be readily replaced without disturbing the connection between the shoe and the pigtail. This greatly reduces the replacement costs of a coupling member.

With the above and other objects in view that will hereinafter appear, the nature of the invention will be more clearly understood by reference to the following detailed description, the appended claims and the several views illustrated in the accompanying drawings:

IN THE DRAWINGS

FIG. 3 is an enlarged vertical sectional view taken through only the coupling member along line 3-3 of FIG. 2 and shows the specific details of construction of the coupling member.

FIG. 4 is a longitudinal sectional view taken transversely through the coupling member along the line 4-4 of FIG. 3 and shows further the construction of the coupling member.

Figure 1:
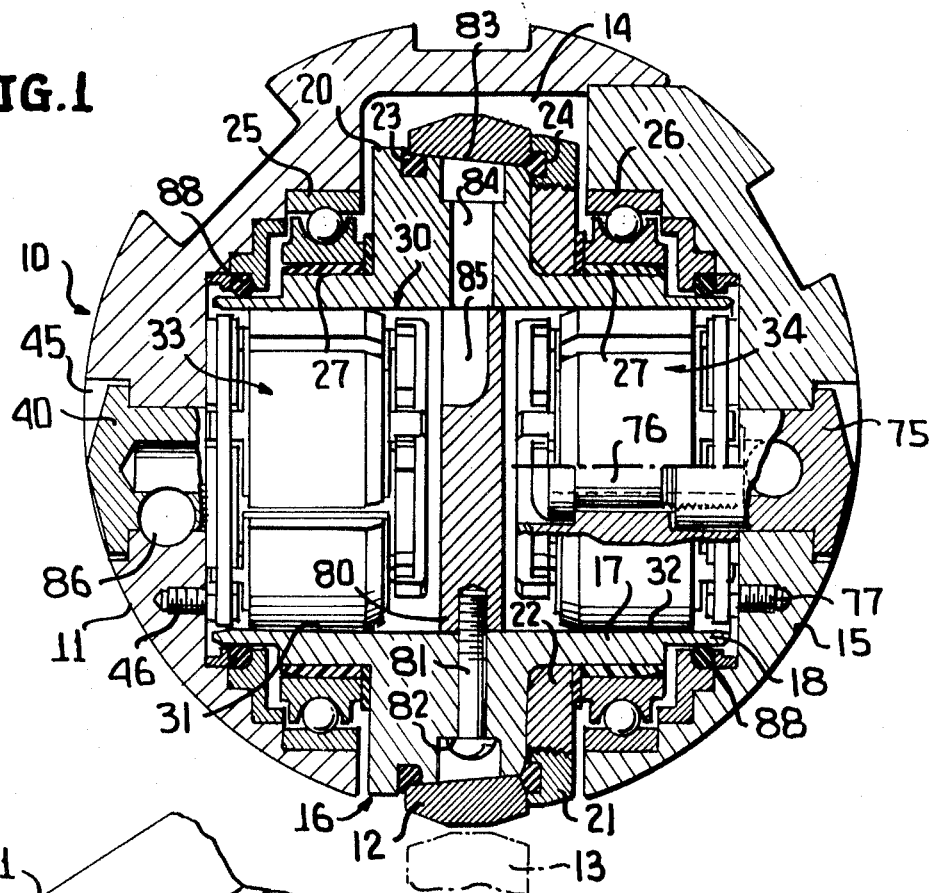
FIG. 1 is a transverse vertical sectional view through a horn of a tube welder and shows the specific details of the mounting of an internal rotary electrode, including the electrical joint between the electrode and the horn.

Referring now to the drawings in detail, it will be seen that there is illustrated in FIG. 1 a portion of a mechanism, which is generally identified by the numeral 10, for welding longitudinal seams of tubular members. The mechanism 10 includes a horn 11 over which tubular members to be welded are telescoped and which serves to support and guide the tubular members. The horn 11 supports an internal roller electrode 12 which cooperates with an external roller electrode 13 for supplying electrical energy to a seam forming portion of a tubular member for effecting the resistance heating and welding thereof.

The internal electrode 12 is mounted within a cavity 14 formed in an intermediate portion of the horn 11. In order that access to the cavity 14 may be readily obtained, the horn 11 has a removable portion in the form of a cheek 15. The cheek 15 is removably secured to the remainder of the horn 11 in any desired manner, but normally by means of removable fasteners (not shown).

A support member, which is generally identified by the numeral 16, is mounted within the cavity 14 for rotation. The support member 16 includes a cylindrical body 17 having end portions 18 of reduced thickness. The support member 16 also includes a centrally positioned annular body part 20 which is integrally formed with the cylindrical body 17.

The internal roller electrode 12 has a wedging fit on the body part 20 and is locked in place by means of a nut 21 which is in threaded engagement with a ring 22 that is separately formed, but is secured by means of fasteners (not shown) to one side of the body part 20. In addition, the internal roller electrode 12 is sealed relative to the support 16 by means of suitable sealing rings 23 and 24.

The support member 16 is mounted within the horn 11 for rotation by means of a bearing 25 carried by the horn proper and a bearing 26 carried by the cheek 15. It is to be noted that the support member 16 is insulated from the bearings 25 and 26 by means of suitable insulation 27.

It is to be understood that the horn 11 is of itself an electrical conductor or may be provided with an electrical conductor which is coupled thereto immediately adjacent the mounting of the support member 16. In accordance with this invention, electrical energy is transferred from the horn 11 and the cheek 15 into the support member 16 by means of an electrical joint, which is generally identified by the numeral 30. Actually, the electrical joint 30 is constructed in two halves, one half of the electrical joint being between the horn 11 and the support member 16 and the other half of the electrical joint being between the cheek 15 and the support member 16.

The support member 16 forms a part of the electrical joint 30 and has on opposite sides of the center thereof an internal surface which is cylindrical, the surface disposed adjacent the horn proper 11 being identified by the numeral 31, and the surface disposed adjacent the cheek 15 being identified by the numeral 32. The surface 31 has associated therewith a coupling member which is identified by the numeral 33 while the surface 32 has associated therewith a coupling member which is identified by the numeral 34. The coupling members 33 and 34 being identical, only the coupling member 33 will be described in detail here.

Figure 2:
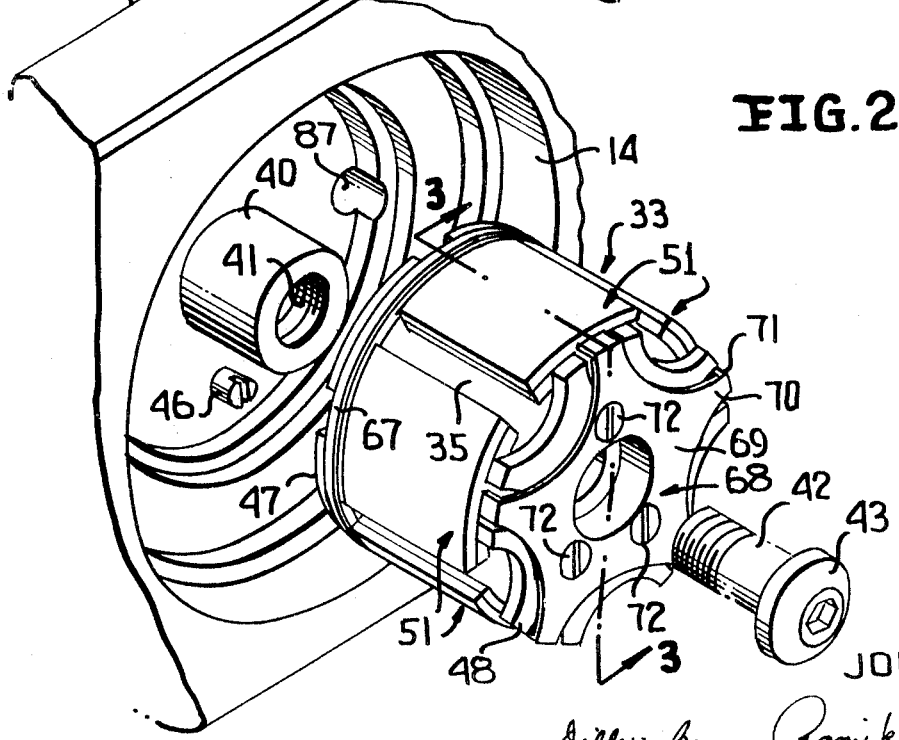
FIG. 2 is an exploded perspective view of a portion of the horn and shows the specific relationship between one of the coupling members and the horn.

Referring now to FIGS. 2, 3 and 4 in particular, it will be seen that the coupling member 33 includes a hub 35 which is circular in cross section and which has a central bore 36 therethrough. The hub 35 is counterbored as at 37 at one end of the bore 36 and as at 38 at the opposite end of the bore 36. As is best shown in FIG. 2, the horn 11 is provided with a boss 40 which is adapted to be snugly received within the counterbore 37. The boss 40 is provided with an internally threaded bore 41 into which a hollow bolt 42 is threaded, the bolt 42 passing through the bore 36 and having an enlarged head 43 which becomes seated in the counterbore 38. As is best shown in FIG. 1, the boss 40 may be in the form of a separately formed fitting having an enlarged head 44 which is seated in a bore 45 formed in the horn 11.

At this time it is pointed out that while the bolt 42 does securely secure the hub 35 in place relative to the horn 11, rotation of the hub 35 about the boss 40 is prevented by means of an anchoring pin 46 which is removably threaded into the horn 11, as is shown in FIG. 1. The anchoring pin 46 is received in a similarly configured bore (not shown) in the end of the hub 35 having the counterbore 37 formed therein.

The hub 35 is provided at the left end thereof, as viewed in FIG. 3, with a radial flange 47 and at the right end thereof with a radial flange 48. The flange 47 is provided with a plurality of circumferentially spaced notches 49 which open radially outwardly through the periphery of the flange 47. The flange 48 is provided with similar notches 50.

The notches 49 and 50 are in axial alignment and each set of notches 49 and 50 has axially aligned therewith a brush unit which is generally identified by the numeral 51. Each brush unit 51 includes a shoe 52 which is provided at the opposite ends thereof with narrow axial projections which are seated in the notches 49 and 50 so as to restrain the brush units 51 against rotation relative to the hub 36. On the other hand, limited freedom of movement of each brush unit 51 in a radial direction is permitted.

It is to be noted that each brush unit 51 also includes a brush 54 which is replaceably bonded to the respective shoe 52 by means of a bonding material 55. The bonding material 55 is preferably in the form of a solder having high conductivity. It is to be understood that when the brushes 54 wear down, they may be readily replaced by merely heating the same so as to melt the solder 55 and thereafter a like new brush may be soldered to the respective shoe 52. The shoes 52 are preferably formed of copper while the brushes 54 are preferably formed of silver graphite although other metals and alloys may be utilized.

It is to be noted that although the brush units 51 are movable relative to the hub 35, a permanent electrical connection is maintained between each brush unit 51 and the hub 35 by means of a plurality of pigtails 56. In the illustrated form of the invention, there are are four pigtails 56 coupled to each of the shoes 52.

Each pigtail 56 has one end portion 57 which is positioned within an axial bore in the flange 48 and is bonded thereto by a layer of bonding material 60 which is electrically conductive and is preferably in the form of a solder. In a like manner, each pigtail 56 has a second end portion 61 which is positioned within a radial bore 62 in the associated shoe 52 and is bonded thereto by means of an electrically conductive bonding material 63, preferably a suitable solder. It is further to be understood that normally the solder 60 and 63 will be the same, but will have a lower melting temperature than the solder 55. By so correlating the melting temperatures of the solders, it will be apparent that a brush 54 may be removed from its respective shoe 52 by melting the solder 55 and securing the same in place without melting either the solder 63 or the solder 60. Thus, the brushes 54 may be replaced without disturbing the connections between the pigtails and the shoes.

It will be readily apparent from FIG. 3 that each shoe unit 51 is radially outwardly urged by means of a resilient element preferably in the form of a spring 65. Each spring 65 is positioned within a combined guide and holder 66 which is partially seated within the hub 35.

It is to be understood that the spring 65 will urge its respective shoe unit 51 radially outwardly so as to bring the shoe 54 into wiping contact with the cylindrical surface 31 of the support member 16. Thus, high amperage electrical current may be transferred between the brush 54 and the support member 16 notwithstanding the fact that the brush member 54 is stationary and the support member 16 is rotating. It will be readily apparent that each brush 54 is free to shift relative to the hub 55 sufficiently to maintain full contact with the internal cylindrical surface 31 and thus compensate for any misalignment of the support member 16 with respect to the hub 35.

It is to be noted that it is highly desirable that the coupling member 33 be readily handleable as a unit notwithstanding the fact that the brush units 51 are resiliently urged radially outwardly. Accordingly, there is associated with the flange 47 a retaining ring 67 which closes the outer ends of the notches 49 and thus limits the radial outward movement of the associated projecting portions 53 of the shoes 52.

In order that the coupling member 33 may be readily disassembled, the opposite end thereof is provided with a spider, which is generally identified by the numeral 68, for retaining the brush units in place. The spider 68 is generally of a platelike configuration and includes a central portion 69 having a plurality of legs 70 radiating therefrom. Each leg 70 terminates in an axially extending foot 71 which is aligned with the outer end of the respective notch 50 to close the same. The spider 68 is releaseably secured to the hub 35 by means of a plurality of countersunk fasteners 72.

Attention is directed at this time to the fact that the end of each brush 54 is tapered as at 73 to facilitate the insertion of the brushes 54 into the support member 16. It is to be understood that in the assembling of the internal roller electrode 12, the roller electrode 12 is mounted on the support member 16 and then the support member 16 is slid over the coupling member 33 which has already been positioned within the cavity 14. Thus, there is no possibility of compressing the brush units 51 at the time the support member 16 is being mounted on the coupling member 33. It is also readily apparent that the coupling member 33 must be mounted in place in advance of assembly with the support member 16 inasmuch as it must be secured to the horn 11 by means of the bolt 42.

The coupling member 34 is fixedly secured to the cheek 15 in the same manner as that described with respect to the coupling member 33. The horn 11 is provided with a fitting 75 which is identical with the fitting 40 and the coupling member 34 is mounted thereon and secured in place on the cheek 15 by means of a bolt 76 which is identical with the bolt 42. The coupling member 34 is also secured against rotation relative to the cheek 15 by means of a locating pin 77 which is identical to the locating pin 46.

It will be readily apparent that when the support member 16 is properly assembled within the horn 11, it is fully supported for rotation by means of the bearings 25 and 26 and is fully electrically coupled to the horn 11 and the cheek 15 by means of the rotary electrical joint 30. Since the brushes 54 are permanently electrically connected to the hubs 35 and since the hubs 35, in a like manner, are tightly electrically coupled to the horn 11 and the cheek 15, it will be seen that there is no true joint interface except that between the brushes 54 and the internal cylindrical surfaces 31 and 32. Because of the specific mounting of the brushes 54, it will be readily apparent that the desired interface contact is provided.

At this time it is particularly pointed out that replacement normally occurs because of the need to replace the internal roller electrode 12. With the specific electrical joint 30, it is merely necessary to remove the cheek 15 and then pull the entire assembly of the support member 16 and the internal roller electrode 12 out of the cavity 14. Then an identical support member 16 with a new internal roller electrode 12 mounted thereon is positioned over the coupling member 33, followed by the positioning of the cheek 15 and the coupling member 34 carried thereby. As a result, the internal roller electrode 12 may be quickly changed.

It is to be understood that in the past, it has been necessary to not only change the support member 16, but the coupling members associated therewith, that is the entire rotary electrical joint because the relatively moving components of the electrical joint had to be run in or lap fitting to one another. However, since the coupling members 33 and 34 require engagement only with cylindrical surfaces, there is no need to specially lap in or run in the brushes 54 with respect to a mating cylindrical surface. Instead, it is possible to change the support member 16 without changing the coupling members 33 and 34. It will be readily apparent that this greatly enhances the replacement of an internal roller electrode 12 and minimizes the shutdown time required for this operation.

Merely for the purpose of fully describing the structure shown in FIG. 1, it is to be noted that the support member 16 is provided with a centrally located internal baffle 80. The baffle 80 is secured in place by removable fasteners 81 having heads 82 seated in an annular groove 83 formed in the peripheral surface of the enlarged part 20. The groove 83 functions as a coolant passage for coolant which cools the internal roller electrode 12.

Coolant passes into and out of the coolant passage 83 through radial coolant passages 84 which, in turn, are in communication with coolant passages 85 formed in the partition 80.

It is to be understood that the flow of coolant is also through the rotary electrical joint 30. The coolant flows into the cavity 14 normally through the fitting 40, which is coupled to a coolant passage 86, and through the hollow bolt 42. Coolant may also be supplied into the cavity 14 through a passage 87, as is best shown in FIG. 2, to assure flow through the coupling member 33. The coolant from the left of the partition 80 will then pass into the support member 16 to cool the internal electrode 12, and then come out to the right side of the partition 80 and pass through and around the coupling member 34 and exit through the cheek 15 in the manner described with respect to the entrance of the coolant.

In order to confine the flow of coolant to certain areas only of the cavity 14, there is provided at each end of the support member 16 an annular sealing ring 88 which is properly seated within the horn 11 and the cheek 15 and which bears against the reduced diameter end portion 18 of the cylindrical body 17 of the support member 16.

It will be readily apparent that in the use of the pigtail connections, the number of interfaces is reduced while at the same time adequately compensating for any misalignment between the fixed and rotating components of the electrical joint. As a result, although the coupling members 33 and 34 may be of a relatively small diameter, the horn 11 having a diameter as small as on the order of 2 inches, the rotary electrical joint 30 may pass electrical energy on the order of 5 volts and 6,000 amperes.

Although only a preferred embodiment of the invention, as well as a preferred installation thereof, has been specifically illustrated and described herein, it is to be understood that minor variations may be made in the rotary electrical joint without departing from the spirit of the invention.

I claim:

1. A rotary electrical joint comprising a hub member, a rotor member mounted concentric of said hub member for relative rotation, and electrical current transfer means disposed between said hub member and said rotor member in concentric relation therewith, said transfer means comprising a plurality of brush units carried by one of said members in adjacent circumferentially spaced relation and in intimate wiping contact with a continuous cylindrical surface of the other of said members, said brush units being carried by said one member for radial movement, means disposed between said one member and said brush units resiliently urging said brush units radially away from said one member, at least one pigtail directly electrically coupling each brush unit to said one member each brush unit includes a brush carried by a shoe with each brush being bonded to its respective shoe, and the bonding material between each brush being electrically conductive and meltable.

2. The rotary electrical joint of claim 1 wherein each pigtail is also bonded to a respective shoe, the bonding materials for said pigtails and said brushes being electrically conductive and meltable, the melting temperature of said bonding material for said pigtail being higher than the melting temperature of the bonding material for said brushes whereby said brushes may be removed and replaced without disturbing the connections between said brushes and said shoes.

3. The rotary electrical joint of claim 1 wherein said one member has a pair of end flanges having radially extending circumferentially spaced notches formed therein, said brush units having axial projections seated in said notches, and retainers carried by said end flanges in notch closing positions and limiting radial movement of said brush unit against the radial urging of said resilient means whereby said one member may be readily handled as a unit without release of said brush units.

4. In combination with a support and a relatively rotating member carried by said support, a rotary electrical joint between said support and said rotating member, said rotary electrical joint comprising an internal continuous cylindrical surface on said rotating member and a coupling member secured to said support and having brush units in wiping electrical current transferring contact with said cylindrical surface, said coupling member including a stationary hub, said brush units being disposed about said hub in circumferentially adjacent relation, securing means securing said brush elements to said hub in circumferentially restrained relation while permitting radial outward movement, resilient means disposed between said hub and said brush units urging said brush units radially outwardly into intimate contact with said cylindrical surface, at least one pigtail directly coupling each brush unit to said hub, and the bonding material between each brush being electrically conductive and meltable.

5. The rotary electrical joint of claim 5 wherein said securing means includes said hub having a radially outwardly extending flange at each end thereof with said brush units being positioned between said flanges, said flanges having radial notches therein and said brush units having end projections positioned within said notches, and means closing the outer ends of said notches and limiting the outward movement of said brush units whereby said coupling member may be readily handled.

6. The rotary electrical joint of claim 5 wherein said means closing the outer ends of said notches include a ring around one of said flanges and a spider carried by the other of said flanges, said spider being in the form of a plate releaseably secured to said hub and having a radial leg for each of the notches in said other flange and aligned therewith, and a foot on each leg projecting axially into a respective notch at the outer end thereof.

7. The rotary electrical joint of claim 5 wherein each pigtail is also bonded bonded a respective shoe, the bonding materials for said pigtails and said brushes being electrically conductive and meltable, the melting temperature of said bonding material for said pigtail being higher than the melting temperature of the bonding material for said brushes whereby said brushes may be removed and replaced without disturbing the connections between said brushes and said shoes.